US008243593B2

(12) United States Patent
Natchu (10) Patent No.: US 8,243,593 B2
(45) Date of Patent: Aug. 14, 2012

(54) MECHANISM FOR IDENTIFYING AND PENALIZING MISBEHAVING FLOWS IN A NETWORK

(75) Inventor: Vishnu Natchu, Santa Clara, CA (US)

(73) Assignee: Sable Networks, Inc., Santa Clara, CA (US)

( * ) Notice: Subject to any disclaimer, the term of this patent is extended or adjusted under 35 U.S.C. 154(b) by 1098 days.

(21) Appl. No.: 11/022,599

(22) Filed: Dec. 22, 2004

(65) Prior Publication Data

US 2006/0133280 A1  Jun. 22, 2006

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................................... 370/229
(58) Field of Classification Search ........... 370/229–236
See application file for complete search history.

(56) References Cited

U.S. PATENT DOCUMENTS

| 6,167,041 | A  | * | 12/2000 | Afanador ...................... 370/353 |
| 6,252,848 | B1 | * | 6/2001  | Skirmont ...................... 370/229 |
| 6,310,881 | B1 | * | 10/2001 | Zikan et al. .................... 370/401 |
| 6,934,250 | B1 | * | 8/2005  | Kejriwal et al. ............... 370/229 |
| 7,113,990 | B2 | * | 9/2006  | Scifres et al. ................. 709/224 |
| 2002/0032717 | A1 | * | 3/2002 | Malan et al. ................... 709/105 |
| 2005/0141426 | A1 | * | 6/2005 | Hou .............................. 370/235 |
| 2005/0226149 | A1 | * | 10/2005 | Jacobson et al. .............. 370/229 |
| 2010/0110889 | A1 | * | 5/2010 | Yazaki et al. ................. 370/230 |

* cited by examiner

*Primary Examiner* — Xavier Szewai Wong
(74) *Attorney, Agent, or Firm* — West & Associates, A PC; Stuart J. West; Shaun N. Sluman (57) ABSTRACT

A mechanism is disclosed for identifying and penalizing misbehaving flows in a network. In one implementation, a set of behavioral statistics are maintained for each flow. These behavioral statistics are updated as information packets belonging to a flow are processed. Based upon these behavioral statistics, a determination is made as to whether a flow is exhibiting undesirable behavior. If so, a penalty is imposed on the flow. In one implementation, this penalty causes packets belonging to the flow to have a higher probability of being dropped than packets belonging to other flows that do not exhibit undesirable behavior. In one implementation, in addition to penalizing the flow, this penalty also has the effect of correcting the flow's behavior such that the flow exhibits less undesirable behavior after the penalty than before. By correcting the flow's behavior, the penalty makes it possible for the flow to become a non-misbehaving flow.

44 Claims, 5 Drawing Sheets

MECHANISM FOR IDENTIFYING AND PENALIZING MISBEHAVING FLOWS IN A NETWORK

BACKGROUND

With the advent of file sharing applications such as KaZaA, Gnutella, BearShare, and Winny, the amount of peer-to-peer (P2P) traffic on the Internet has grown immensely in recent years. In fact, it has been estimated that P2P traffic now represents about 50-70 percent of the total traffic on the Internet. This is so despite the fact that the number of P2P users is quite small compared to the number of non P2P users. Thus, it appears that most of the bandwidth on the Internet is being consumed by just a minority of the users. For this and other reasons, P2P traffic is viewed by ISP's (Internet service providers) and others as being abusive/misbehaving traffic that should be controlled and penalized.

In order to control P2P traffic, however, it first needs to be identified. Earlier generations of P2P protocols used fixed TCP port numbers for their transmissions. For example, Fast-Track used TCP port 1214. This made P2P traffic easy to identify. Current P2P protocols, however, no longer have to use fixed port numbers. Rather, they can be configured to use random dynamic port numbers so that P2P traffic can now be masqueraded as other types of traffic, such as HTTP web browsing and unspecified TCP traffic. As a result, the current P2P protocols have rendered the port-based identification techniques ineffective.

Another technique that has been used to identify P2P traffic involves the use of signatures. Specifically, it was observed that some P2P protocols inserted distinct information into their data packets. Using this distinct information as a signature, it was possible to identify packets that were assembled using those P2P protocols. This technique has several problems. First, it usually is effective for only a relatively short period of time. As the P2P protocols evolve and mutate (which they do on a fairly constant basis), their signatures change. Once that happens, the previous signatures are no longer valid, and the technique will have to be changed to recognize the new signatures. Another and more serious problem is that the P2P protocols are now evolving to the point that they either leave no signature or they obfuscate their signatures (e.g. by encryption). This makes it extremely difficult if not impossible to identify P2P traffic using signatures.

Overall, P2P protocols have gotten quite sophisticated, and the more sophisticated they become, the more difficult it is to identify P2P traffic. Unless P2P traffic can be identified, it cannot be effectively controlled.

SUMMARY

In accordance with one embodiment of the present invention, there is provided a mechanism for effectively identifying and penalizing misbehaving information packet flows in a network. This mechanism may be applied to any type of network traffic including, but certainly not limited to, P2P traffic. In one embodiment, misbehaving flows are identified based upon their observed behavior. Unlike the prior approaches, they are not identified based upon ancillary factors, such as port numbers and signatures. Because misbehaving flows are identified based upon their observed behavior, and because their behavior cannot be hidden, misbehaving flows cannot avoid detection. Thus, regardless of which protocols they use, or how those protocols try to hide/obfuscate their nature, misbehaving flows can be identified. Once identified/detected, they can be controlled and/or penalized.

In one embodiment, a flow is processed as follows. One or more information packets belonging to the flow are received and processed. As the information packets are processed, a set of behavioral statistics are maintained for the flow. These behavioral statistics reflect the empirical behavior of the flow. In one embodiment, the behavioral statistics include a total byte count (sum of all of the bytes in all of the packets of the flow that have been processed up to the current time), a life duration (how long the flow has been in existence since inception), a flow rate (derived by dividing the total byte count by the life duration of the flow), and an average packet size (derived by dividing the total byte count by the total number of packets in the flow that have been processed). These behavioral statistics are updated as information packets belonging to the flow are processed; thus, they provide an up to date reflection of the flow's behavior.

Based at least partially upon the behavioral statistics, a determination is made as to whether the flow is exhibiting undesirable behavior. In one embodiment, this determination may be made by computing a badness factor for the flow. This badness factor is computed based, at least partially, upon the behavioral statistics, and this badness factor provides an indication as to whether the flow is exhibiting undesirable behavior. In one embodiment, the badness factor also provides an indication of the degree to which the flow is misbehaving.

If the flow is exhibiting undesirable behavior, then a penalty may be enforced on the flow. In one embodiment, the penalty to be enforced is determined based, at least partially, upon the badness factor. This penalty may be an increased drop rate. When enforced on the flow, this increased drop rate causes the information packets belonging to the flow to have a higher probability of being dropped than information packets belonging to other flows that do not exhibit undesirable behavior. Thus, more packets may be dropped from the flow than from other non-misbehaving flows. In one embodiment, this penalty is enforced on the flow only if a congestion condition is encountered. Thus, if there is no congestion, the flow (even if it is exhibiting undesirable behavior) is not penalized.

In one embodiment, enforcing the penalty on the flow has the effect of correcting the flow's behavior. That is, enforcing the penalty causes the badness factor of the flow to improve (e.g. decrease). As a result, by application of the penalty, a currently misbehaving flow can be turned into a non-misbehaving flow in the future. Once the flow is no longer misbehaving, it is no longer subject to penalty. In this manner, a misbehaving flow can be identified, penalized, and even rehabilitated in accordance with one embodiment of the present invention.

DETAILED DESCRIPTION OF EMBODIMENT(S)

Network Overview

Figure 1:
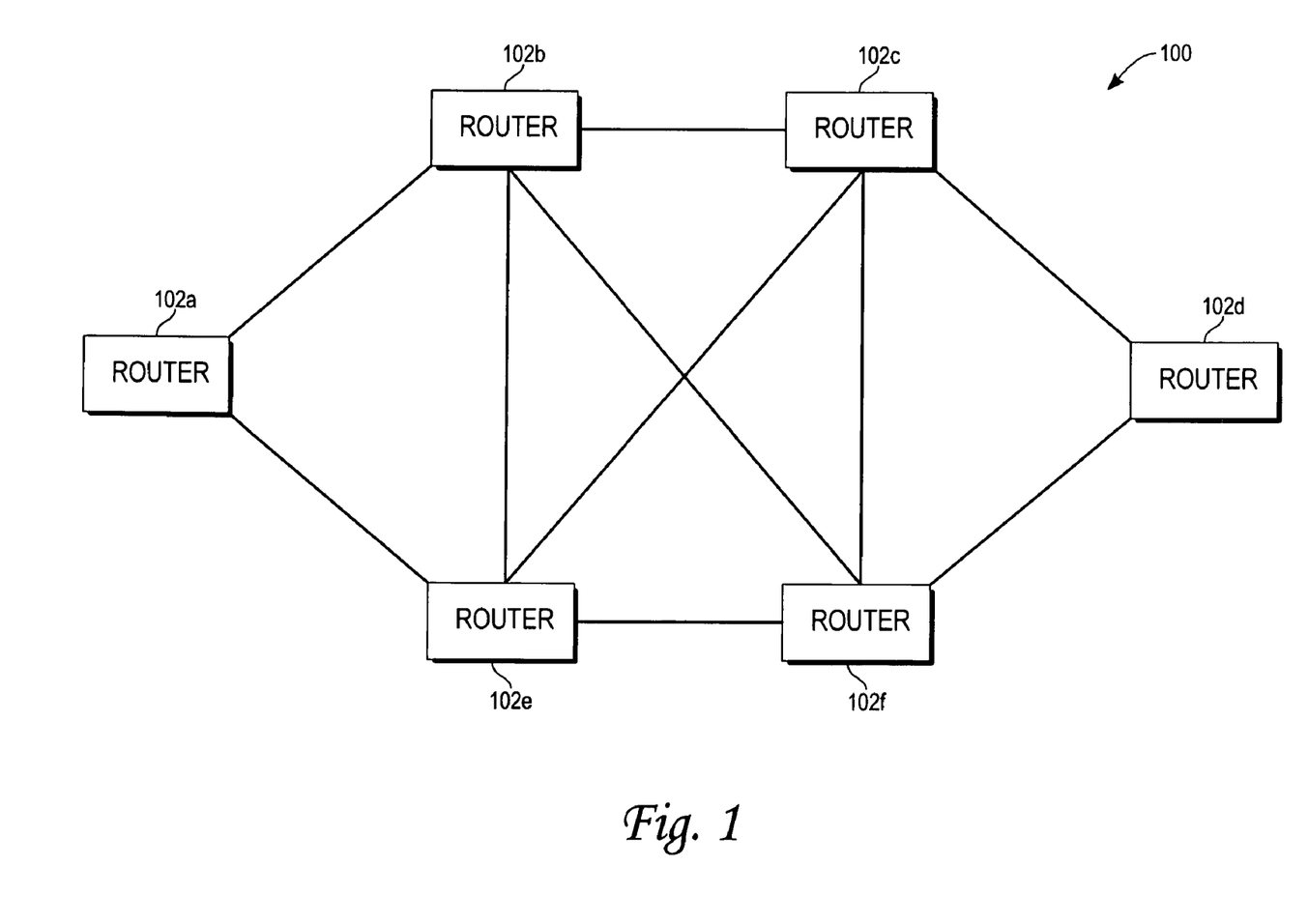
FIG. 1 shows an overview of a network in which one embodiment of the present invention may be implemented.

With reference to FIG. 1, there is shown an overview of a network 100 in which one embodiment of the present invention may be implemented. As shown, the network 100 comprises a plurality of routers 102 interconnected to each other by trunks or links in such a way that each router 102 has multiple possible paths to every other router 102. For example, information from router 102a may reach router 102d by going through routers 102b and 102c, or routers 102e and 102f, and information from router 102c may reach router 102a by going through router 102b or router 102e. Interconnecting the routers 102 in this way provides flexibility in determining how information from one router 102 is delivered to another, and makes it possible to route around any failures that might arise. For the sake of simplicity, only a few routers 102 are shown in FIG. 1; however, it should be noted that network 100 may be much more complex if so desired, comprising more routers 102, more connections between the routers 102, and other components.

In addition to being coupled to each other, each router 102 may further be coupled to various machines (not shown), such as clients and servers, from which information originates and to which information is destined. By going through the routers 102, each of these machines may send information to any of the other machines in the network 100.

Information is conveyed from one router 102 to another via a physical link or trunk. Depending on the type of network, this link or trunk may be an optical medium (e.g. an optical fiber), a coaxial cable, or some other type of medium. For purposes of the present invention, network 100 may use any type of transport medium.

Router Overview

Figure 2:
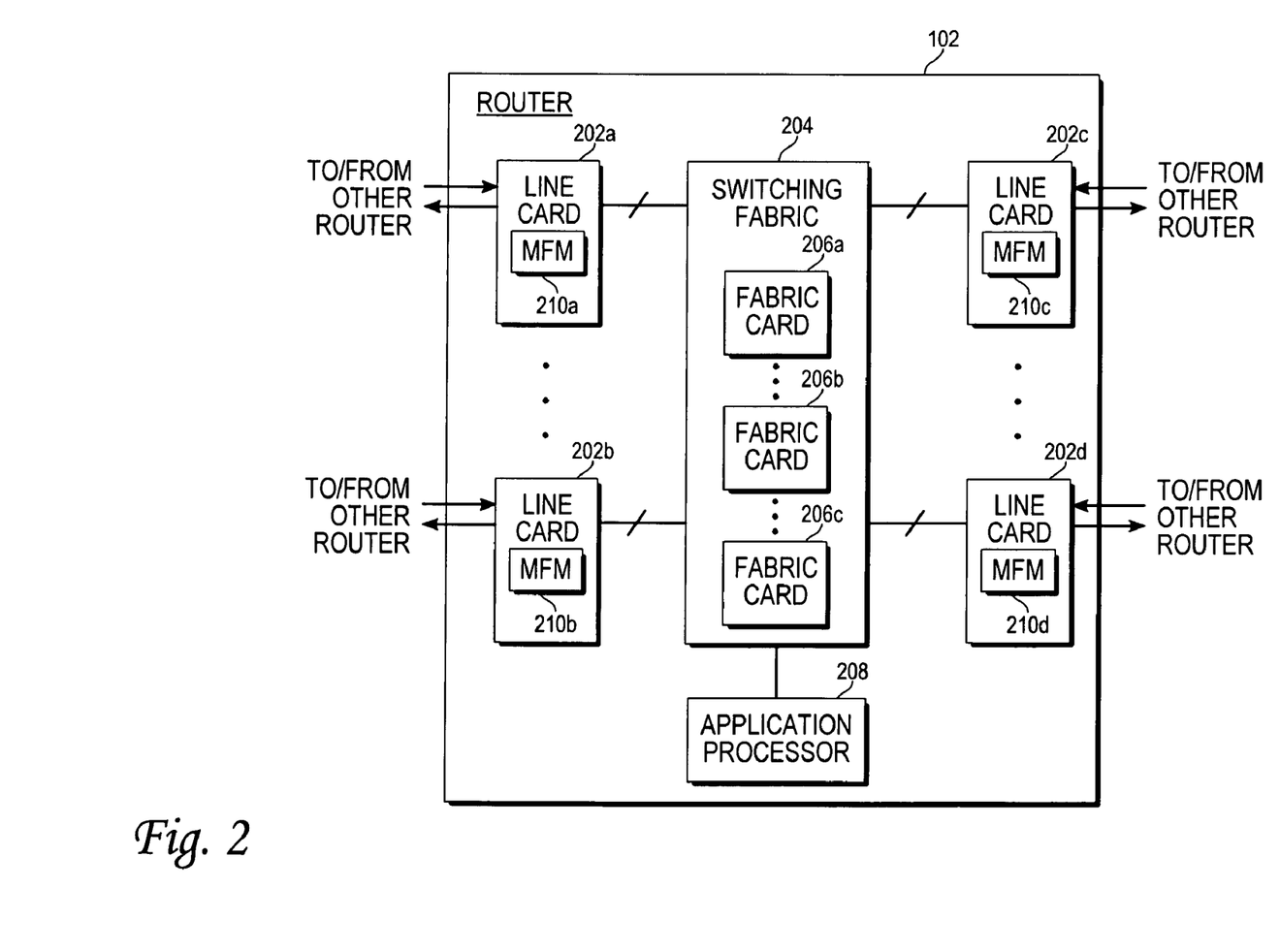
FIG. 2 is a block diagram of a router in which one embodiment of the present invention may be implemented.

FIG. 2 shows a block diagram of a sample router 102 that may be used to implement one or more of the routers 102 in network 100. As shown in FIG. 2, the router 102 comprises a plurality of line cards 202 for coupling the router 102 to one or more of the other routers 102 in the network 100. For example, assuming that the router 102 in FIG. 2 is router 102b in network 100, line card 202d may couple router 102b to router 102f, line card 202c may couple router 102b to router 102c, line card 202b may couple router 102b to router 102e, and line card 202a may couple router 102b to router 102a. Overall, the line cards 202 act as the router's 102 interfaces to the rest of the network 100. In one embodiment, the trunks coupled to the line cards 202 are bi-directional; thus, each line card 202 may receive information from another router, or send information to another router. Put another way, each line card 202 is capable of acting as an ingress line card (to receive information from another router) or an egress line card (to send information to another router). Whether a particular line card 202 is acting as an ingress or an egress line card at any particular time depends upon the flow of network traffic.

To couple the line cards 202 to each other within the router 102, there is provided an internal switching fabric 204. In one embodiment, the switching fabric 204 comprises a plurality of interconnected fabric cards 206. Basically, the switching fabric 204 provides a mechanism for coupling any line card 202 to any other line card 202 within the router 102 so that information can be transported from any ingress line card 202 to any egress line card 202. By transporting information from an ingress line card 202 to an egress line card 202, the switching fabric 204 routes information through the router 102 and sends it on its way to the next hop (i.e. the next router). Information is thus received and routed by the router 102.

To increase the flexibility of the router 102 and to facilitate the process of failure recovery, each line card 202, in one embodiment, has multiple connections to the switching fabric 204. In addition, the switching fabric 204 provides multiple routes for connecting each line card connection to every other line card connection. With such a setup, each line card 202 has multiple routes to every other line card 202 in the router 102. For example, one possible route from line card 202d to line card 202a may pass through fabric card 206c, while another route may pass through fabric card 206b. By providing multiple routes between the various line cards 202, the switching fabric 204 makes it possible to route around any internal failures that may arise.

In addition to the line cards 202 and the switching fabric 204, the router 102 further comprises an application processor 208. In one embodiment, the application processor 208 determines the forwarding paths, and hence, the egress line cards, that can be used to forward information to any particular destination address. Put another way, given a destination address, the application processor 208 determines which line card 202 or line cards are most suitable to act as the egress line card to forward information to that destination address. For example, suppose that the router 102 in FIG. 2 is router 102b in network 100, and that the destination is a machine coupled to router 102d. Suppose further that line card 202c is coupled to router 102c and line card 202d is coupled to router 102f. In such a case, because the most direct routes to router 102d are through either router 102c or 102f, the most suitable egress line cards for forwarding information to the destination router 102d are probably line cards 202c and 202d. Accordingly, the application processor 208 designates these line cards 202c, 202d as potential egress line cards for destination router 102d, with one being designated as the primary egress line card and the other being the alternate.

Once the egress line card determinations are made by the application processor 208 for each destination address, they are communicated to each of the line cards 202 in the router 102. In turn, each line card 202 stores the information into a forwarding table residing on the line card 202. Thereafter, when a line card 202 acts as an ingress line card and receives a set of information, it can use the forwarding table to determine the appropriate egress line card 202 to which to forward the information. Because the egress line card information is predetermined and stored in the forwarding table, the ingress line card simply has to perform a table lookup to determine the proper egress line card. No on-the-fly calculation needs to be performed. Since table lookup operations can be carried out very quickly, the process of determining the proper egress line card requires relatively little time.

Information Routing

In one embodiment, information is routed from router to router, and from line card 202 to line card 202, in the form of information packets. Each packet represents a set of information that is sent by a source to a destination. To enable it to be properly routed, a packet typically comprises a header portion. The header portion contains information that is used by the line cards 202 to determine the next hop for the packet. Depending upon the routing protocol used, the information contained in the header portion may differ. In one embodiment, the header portion comprises the following sets of information: (1) a source address (i.e. the network address of the entity sending the packet); (2) a source port number; (3) a destination address (i.e. the network address of the entity that is to receive the packet); (4) a destination port number; and (5) an indication of the routing protocol that is to be used. These sets of information may be referred to as the "five tuple". Using this header information, an ingress line card 202 can determine to which egress line card 202 the packet should be routed.

In addition to the header portion, a packet also comprises a payload. The payload comprises the actual data that the source is trying to send to the destination. In addition to the actual data, the payload may also include other information, such as information inserted by other protocols (e.g. P2P protocols). This additional information may be needed by the destination to properly process the packet.

In one embodiment, one or more packets may be grouped into a flow. For purposes of the present invention, a flow is a series of packets that are related in some manner. In one embodiment, packets are grouped into a flow if they share a sufficient amount of header information. More specifically, in one embodiment, packets belong to the same flow if they have the five tuple in common. Thus, if two or more packets have the same source address, the same source port number, the same destination address, the same destination port number, and the same protocol, they are grouped into the same flow. Usually, barring some failure that requires rerouting, all of the packets belonging to a flow are received by the same ingress line card 202 and forwarded to the same egress line card 202. By grouping packets into flows, it is possible to aggregate individual packets in a meaningful way to enable a higher level understanding of the traffic flowing through the router 102 to be derived.

The flows that pass through a router 102 may represent many different types of traffic. For example, the flows may contain web browsing traffic, TCP traffic, P2P traffic, etc. As noted previously, some traffic is more abusive/misbehaving than others. P2P traffic, for example, is often considered to be abusive. Other types of traffic may also be considered abusive. To make the best use of available resources, and to best control the traffic that passes through the router 102, it is desirable for the router 102 to be able to identify abusive/misbehaving traffic, and to penalize and even rehabilitate that traffic. In one embodiment, the line cards 202 of router 102 have been enhanced to give the router 102 such capability. More specifically, the line cards 202 have been adapted to include a misbehaving flow manager (MFM) 210 for keeping track of flows, determining whether the flows are exhibiting undesirable behavior, and enforcing a penalty on the flows if they are exhibiting undesirable behavior.

For purposes of the present invention, the MFM 210 of the line cards 202 may be implemented in any desired manner. For example, the functionality of the MFM 210 may be realized by having one or more processors on a line card 202 execute one or more sets of instructions. Alternatively, the MFM 210 may be implemented using hardwired logic components (e.g. in the form of one or more ASIC's on a line card 202). These and other implementations are within the scope of the present invention.

Functional Overview of MFM on Line Card

Figure 3:
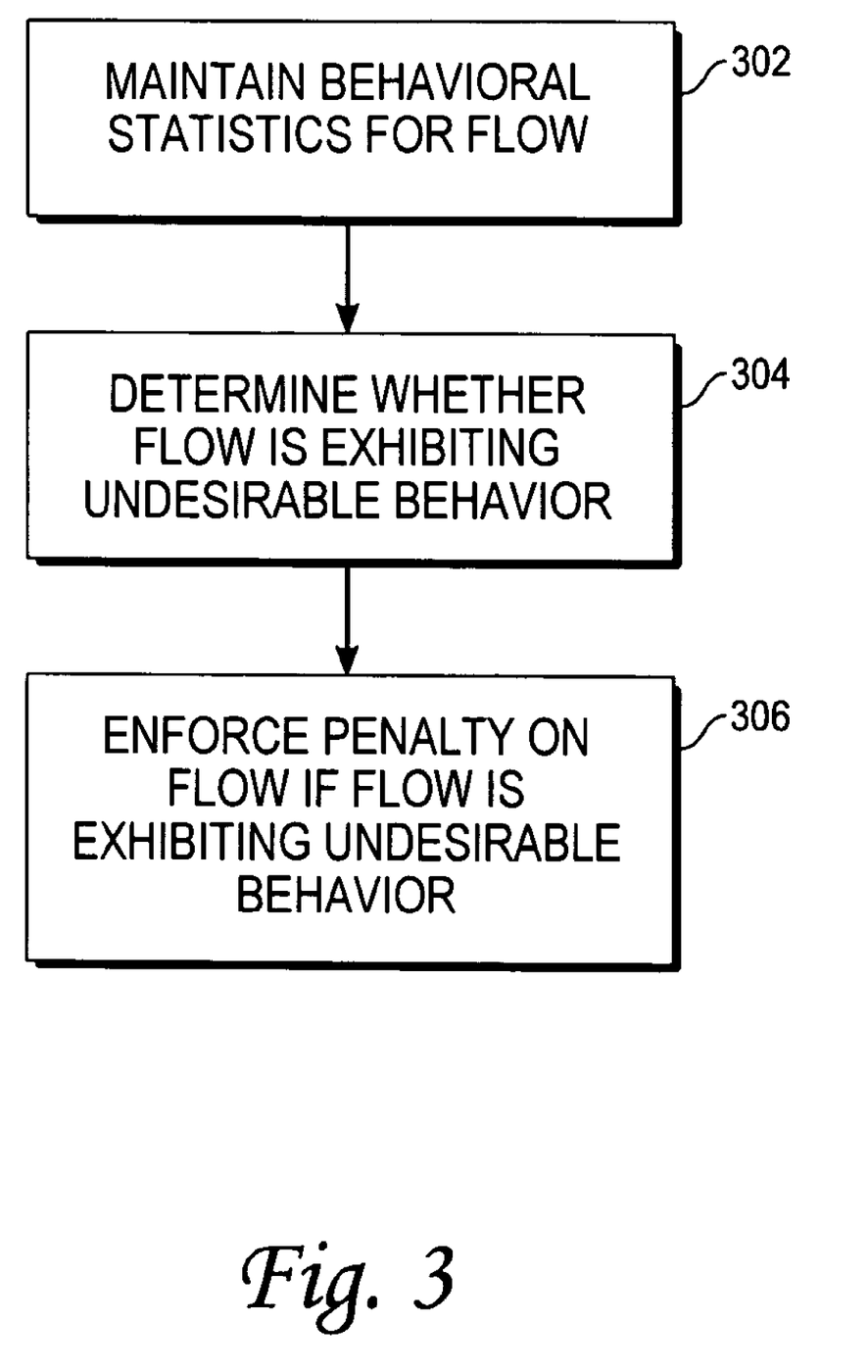
FIG. 3 is an operational flow diagram showing the operation of a misbehaving flow manager (MFM) in accordance with one embodiment of the present invention.

With reference to FIGS. 2 and 3, a functional overview of the operation of an MFM 210 in accordance with one embodiment of the present invention will now be described. In the following discussion, it will be assumed that the MFM 210 is on a line card 202 that is acting as an egress line card (i.e. the line card is receiving packets from an ingress line card and sending packets out to another router). However, it should be noted that the MFM 210 on a line card may process flows in the same manner even when the line card 202 is acting as an ingress line card (i.e. the line card is receiving packets from another router and sending them to an egress line card).

Initially, an MFM 210 receives and processes one or more packets belonging to a flow. Processing a packet may, but does not necessarily, involve forwarding the packet to another router. As the packets of a flow are processed, a set of behavioral statistics are maintained (block 302 of FIG. 3) for the flow. These behavioral statistics reflect the empirical behavior of the flow. In one embodiment, the behavioral statistics include a total byte count (sum of all of the bytes in all of the packets of the flow that have been processed up to the current time), a life duration (how long the flow has been in existence since inception), a flow rate (derived by dividing the total byte count by the life duration of the flow), and an average packet size (derived by dividing the total byte count by the total number of packets in the flow that have been processed). These behavioral statistics are stored by the line card 202 in a flow block associated with the flow, and are updated as information packets belonging to the flow are processed; thus, these behavioral statistics provide an up to date reflection of the flow's behavior.

Based upon the behavioral statistics, the MFM 210 determines (block 304) whether the flow is exhibiting undesirable behavior. In one embodiment, this determination is made by computing a badness factor for the flow. This badness factor is computed based upon the behavioral statistics of the flow, and provides an indication as to whether the flow is exhibiting undesirable behavior. In one embodiment, the badness factor also provides an indication of the degree to which the flow is misbehaving.

If the flow is exhibiting undesirable behavior, then the MFM 210 enforces (block 306) a penalty on the flow. In one embodiment, the penalty to be enforced is determined based upon the badness factor. This penalty may be an increased drop rate. When enforced on the flow, this increased drop rate causes the information packets belonging to the flow to have a higher probability of being dropped than information packets belonging to other flows that do not exhibit undesirable behavior. Thus, more packets may be dropped from the flow than from other non-misbehaving flows. In one embodiment, the MFM 210 enforces this penalty on the flow only if a congestion condition is encountered. If there is no congestion, the flow (even if it is exhibiting undesirable behavior) is not penalized.

In one embodiment, enforcing the penalty on the flow has the effect of correcting the flow's behavior. That is, enforcing the penalty causes the badness factor of the flow to improve (e.g. decrease). As a result, by application of the penalty, a currently misbehaving flow can be turned into a non-misbehaving flow in the future. Once the flow is no longer misbehaving, it is no longer subject to penalty. In this manner, an MFM 210 on a line card 202 can identify, penalize, and even rehabilitate a misbehaving flow.

Sample Operation

The above discussion provides a high level overview of the operation of an MFM 210. To facilitate a complete understanding of the invention, a specific sample operation of an MFM 210 in accordance with one embodiment of the present invention will now be described. In the following discussion, it will be assumed that line card 202d of FIG. 2 is acting as an egress line card, and that line card 202b is acting as an ingress line card, which is sending packets to the egress line card 202d. The following discussion describes the operation of the MFM 210d on the egress line card 202d.

Initially, MFM 210d receives a packet from the ingress line card 202b. In processing this packet, the MFM 210d determines whether the packet belongs to an existing flow. In one embodiment, the MFM 210d makes this determination by processing the five tuple contained in the header portion of the packet (e.g. using a hashing function) to derive a flow ID. The MFM 210d then determines whether this flow ID is associated with a flow block that is already stored (e.g. in a memory, not shown) on the egress line card 202d. If so, then the packet is part of an existing flow. If not, then the packet is the first packet of a new flow.

Figure 4:
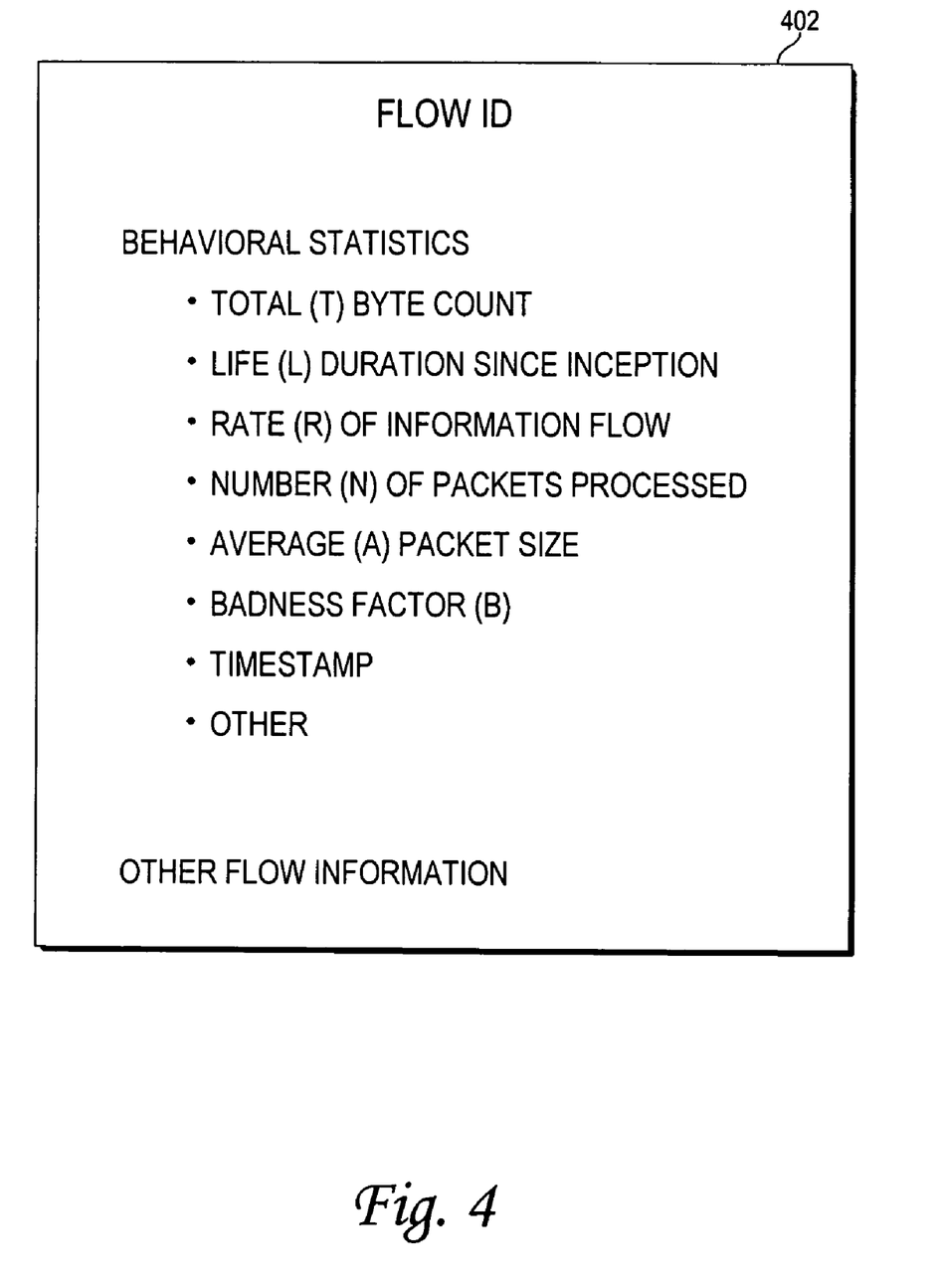
FIG. 4 is a diagram of a sample flow block in accordance with one embodiment of the present invention.

In the present example, it will be assumed that the packet is the first packet of a new flow. In such a case, the MFM 210d creates a new flow block for the new flow. A sample flow block 402 in accordance with one embodiment of the present invention is shown in FIG. 4. As shown, the flow block 402 comprises the flow ID (derived by processing the five tuple), and a set of behavioral statistics. The behavioral statistics include a total (T) byte count (sum of all of the bytes in all of the packets of the flow that have been processed up to the current time), a life duration (L) (how long the flow has been in existence since inception), a flow rate (R) (derived by dividing T by L), a number (N) of packets processed up to the current time, an average (A) packet size (derived by dividing T by N), a badness factor (B), and a timestamp of when the flow block 402 was created. The behavioral statistics may include other sets of information as well. In addition to the above information, the flow block 402 may also include any other information pertinent to the flow. In one embodiment, when the flow block 402 is initially created, the timestamp value is updated with the current time, and the badness factor is set to a default value of 1. The other behavioral statistics are set to 0. The flow block 402 is then stored on the egress line card 202d for future reference.

After creating the flow block 402, the MFM 210d determines whether to forward the packet to the router to which the egress line card 202d is coupled. If the link is currently experiencing congestion, the packet may be dropped. In the current example, it will be assumed that the link is not congested; hence, the MFM 210d forwards the packet to the external router. After doing so, the MFM 210d updates the behavioral statistics to reflect the packet that was just forwarded. More specifically, the MFM 210d updates T to include the forwarded packet's byte count, updates L by computing the difference between the current time and the timestamp, updates R by dividing the updated T by the updated L, updates N to include the forwarded packet, and updates A by dividing the updated T by the updated N.

In addition, the MFM 210d also computes a badness factor for the flow. For purposes of the present invention, the badness factor may be computed using any desired methodology based upon any desired criteria. In one possible specific embodiment, the badness factor is computed in accordance with the function shown in FIG. 5, which takes the minimum of six possible values. One possible value is 16, which represents the maximum possible badness factor for any flow. Another possible value is 1, which is the default badness factor for a flow. Other possible values are the quotient of $T/T_{threshold}$, the quotient of $L/L_{threshold}$, the quotient of $R/R_{threshold}$, and the quotient of $(A-A_{threshold})/(MTU-A_{threshold})$. For purposes of this function, the constants $T_{threshold}$, $L_{threshold}$, $R_{threshold}$, MTU, and $A_{threshold}$ are assigned by an administrator of the router 102. These values can be adjusted to tune the MFM 210d for optimal performance.

Figure 5:
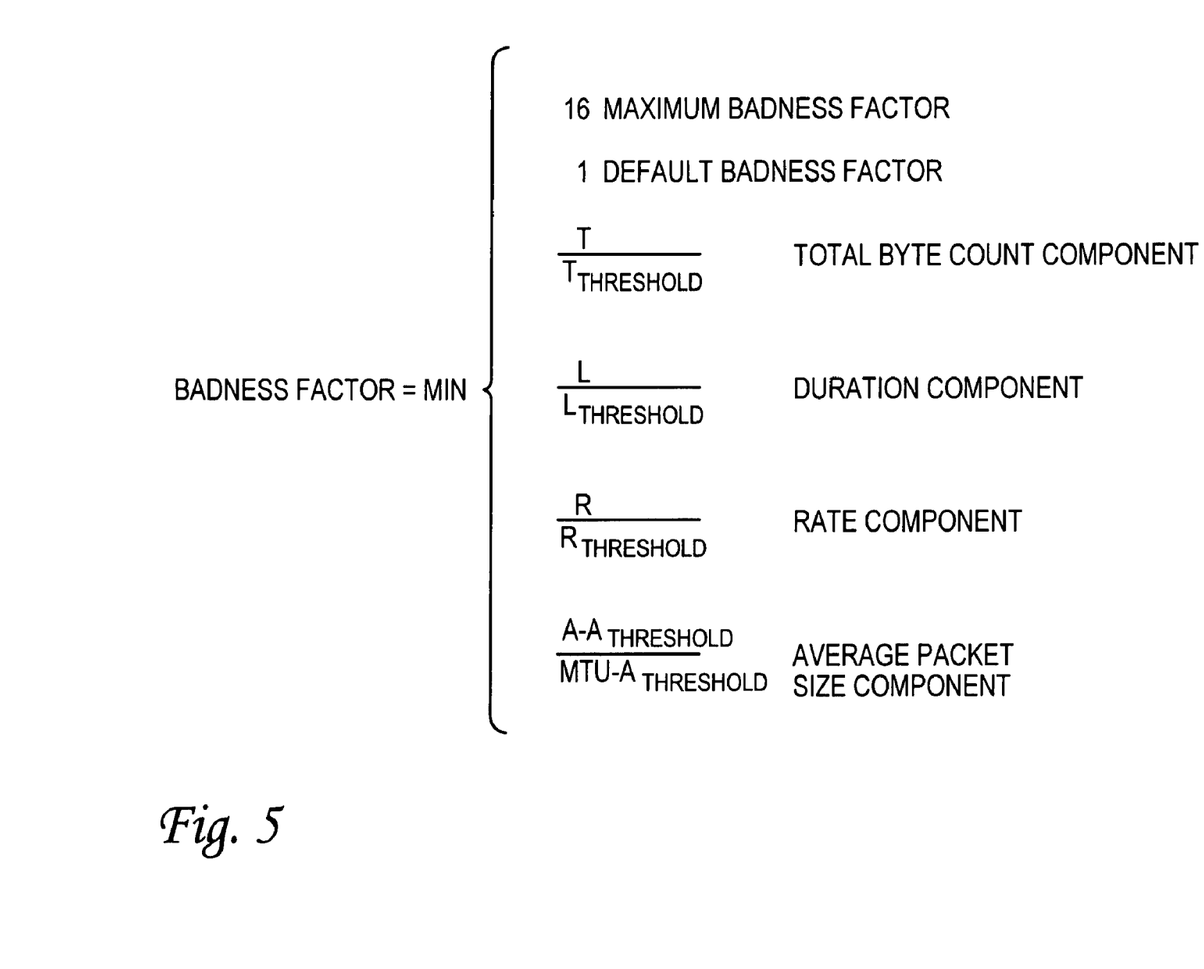
FIG. 5 shows one possible function for computing a badness factor for a flow in accordance with one embodiment of the present invention.

The quotients $T/T_{threshold}$, $L/L_{threshold}$, $R/R_{threshold}$, and $(A-A_{threshold})/(MTU-A_{threshold})$ represent the total byte count component, the duration component, the rate component, and the average packet size component, respectively, of the function. These components are included in the function because it has been found that they provide a measure of whether a flow is misbehaving. For example, it has been found that P2P traffic flows generally have high byte counts, relatively long life, relatively high rates, and relatively large average packet sizes. These characteristics are also found in other types of abusive/misbehaving flows. Thus, these components are manifestations of misbehavior. By taking these components into account in the computation of the badness factor, it is possible to derive a badness factor that provides an indication of whether a flow is misbehaving. In one embodiment, a badness factor value larger than 1 indicates a misbehaving flow. In addition to providing an indication of whether a flow is misbehaving, the badness factor also provides an indication of the degree to which the flow is misbehaving. Thus, a flow with a badness factor of 1.8 is misbehaving to a greater degree than a flow with a badness factor of 1.2.

The function shown in FIG. 5 is just one possible way of computing the badness factor. The function may be changed, augmented, or even replaced. For example, the administrator of the router 102 may configure the MFM 210d to not take one or more of the components into account. For example, the administrator may determine that the duration component is not very indicative of a misbehaving flow, and hence, may configure the MFM 210d to ignore this component. In such a case, the MFM 210d will not use this component in computing the badness factor. Also, a different and even more sophisticated function, one that comprises one or more logical expressions, for example, may be used to compute the badness factor. These and other functions may be implemented. In addition, components other than and/or in addition to those components shown in FIG. 5 may be taken into account in computing the badness factor. Overall, for purposes of the present invention, the badness factor may be computed in any desired way, using any desired methodology and any desired criteria.

After the MFM 210d computes the badness factor, it stores the badness factor into the flow block 402. The behavioral characteristics of the flow are thus updated to reflect the packet that was just forwarded. The MFM 210d is now ready to process another packet. The next time the MFM 210d receives a packet belonging to the same flow, it will recognize that the packet is part of an existing flow; thus, it will not create a new flow block. Instead, it will access the existing flow bock 402 and use and/or update the information contained therein. In the current example, it will be assumed that the MFM 210d receives many more packets belonging to the flow, and forwards and processes them in the manner described above. Thus, the behavioral statistics are repeatedly updated to give rise to a set of relatively mature statistics (which include a relatively mature badness factor) for the flow. In one embodiment, the MFM 210d takes the badness factor of a flow into account only when a congestion condition is encountered (e.g. the outgoing link is experiencing congestion). If there is no such congestion, the MFM 210d will not enforce a penalty on the flow, regardless of the flow's badness value.

Suppose now that the MFM 210d receives another packet belonging to the flow, but that this time, the egress line card 202d is experiencing a congestion condition on the outgoing link. In such a case, the MFM 210d may wish to enforce a penalty on the flow, and the packet may need to be dropped. To determine whether to enforce a penalty on the flow, the MFM 210d accesses the badness factor stored in the flow block 402 associated with the flow. If the badness factor is less than or equal to a threshold value (which in the current example is 1), then no penalty will be enforced on the flow. Hence, the packet will be subject to the non-misbehaving flow drop rate, which in one embodiment is 0.1 (which means that the packet has a 10% chance of being dropped). However, if the badness factor is greater than the threshold value, then the MFM 210d will impose a penalty on the flow. In one embodiment, this penalty takes the form of an increased drop rate. This increased drop rate causes the packet to be subjected to a higher probability of being dropped than packets belonging to flows that are either not misbehaving or are less misbehaving.

In one embodiment, the magnitude of the increased drop rate is determined based upon the value of the badness factor. For purposes of the present invention, any formula/function may be used to determine the increased drop rate. In one embodiment, the increase drop rate rises rapidly relative to the badness factor. Thus, by the time the badness factor reaches 2, the increased drop rate is already 0.5 (which means that the packet has a 50% probability of being dropped). By the time the badness factor is 3, the increased drop rate is 0.7, and by the time the badness factor is 5, the increased drop rate is over 0.8. This rapid increase in drop rate serves to penalize misbehaving flows early before they become too serious a problem. Of course, slower rising drop rates may be used if so desired.

After the drop rate is determined (whether it is the default drop rate or an increased drop rate), it is enforced by the MFM 210d. More specifically, the MFM 210d applies the appropriate probability in determining whether to drop the packet. If, after applying the appropriate drop rate, the packet is not dropped, then the line card 202d forwards the packet to the external router. After that is done, the MFM 210d updates the behavioral statistics of the flow in the manner described above to reflect the forwarded packet.

On the other hand, if the MFM 210d decides to drop the packet, then the egress line card 202d will not forward the packet to the external router. In such a case, the MFM 210d will update the behavioral statistics, but it will do so in a slightly different manner than that described above. Specifically, since the packet was not forwarded, the total byte count T, the number of packets N, and the average packet size A do not change; hence, these values will not be updated. However, the life duration L of the flow (derived by taking the difference between the current time and the timestamp) has changed; thus, it will be updated. Since the rate R depends on L, it will also be updated. In addition, the badness factor will be recomputed. In this manner, the behavioral statistics are updated even when a packet is dropped.

An interesting point to note in the above drop situation is that while the total byte count T has not changed, the life duration L has increased. Since the rate R is derived by dividing T by L, this means that the rate R has decreased as a result of dropping the packet. Since R has decreased, the quotient $R/R_{threshold}$ has also decreased. Because the quotient $R/R_{threshold}$ is one of the components used to determine the badness factor, this decrease could lead to a decrease in the badness factor. Thus, by dropping a packet, the badness factor may be improved (e.g. decreased). As noted above, the penalty imposed on a misbehaving flow is an increased drop rate. By making it more likely that a packet from the misbehaving flow will be dropped, which in turn will cause more packets from the flow to be dropped, the MFM 210d can cause the badness factor of the flow to improve. Thus, the imposition of a penalty on a misbehaving flow has the effect of improving the behavior of the flow. In this manner, not only does the MFM 210d detect and penalize misbehaving flows, it can also rehabilitate them.

In the example discussed above, a penalty is enforced on a misbehaving flow only when a congestion condition is encountered. As an alternative, a penalty may be enforced on a misbehaving flow even when there is no congestion. That is, any time a flow has a badness factor that indicates undesirable flow behavior, the MFM 210d can impose an increased drop rate on the flow, and can enforce that drop rate on packets of the flow, regardless of whether there is congestion. That way, the MFM 210d can manage and control abusive/misbehaving traffic even in the absence of any traffic congestion. This and other modifications and enhancements are within the scope of the present invention.

At this point, it should be noted that although the invention has been described with reference to one or more specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine-implemented method for processing a single flow, the flow comprising a plurality of packets, and the method comprising:
   creating a flow block as the first packet of a flow is processed by a single router;
   said flow block being configured to store payload-content-agnostic behavioral statistics pertaining to said flow, regardless of the presence or absence of congestion;
   said router updating said flow block with the payload-content-agnostic behavioral statistics of each packet belonging to said flow, as each packet belonging to said flow is processed by said router, regardless of the presence or absence of congestion;
   said router heuristically determining whether said flow exhibits undesirable behavior by comparing at least one of said payload-content-agnostic behavioral statistics to at least one pre-determined threshold value; and
   upon determination by said router that said flow exhibits undesirable behavior, enforcing, relative to at least one packet, a penalty;
   wherein the preceding steps are performed on said router without requiring use of inter-router data.

2. A non-transitory computer-readable medium having computer-executable instructions for performing a method to process a single flow, the flow comprising a plurality of packets, and the method comprising:
   creating a flow block as the first packet of a flow is processed by a single router;
   said flow block being configured to store payload-content agnostic behavioral statistics about said flow, regardless of the presence or absence of congestion;
   said router updating said flow block with the flow's behavioral statistics of each packet belonging to said flow, as each packet belonging to said flow is processed by said router, regardless of the presence or absence of congestion;
   said router heuristically determining whether said flow is exhibiting undesirable behavior by comparing at least one of said behavioral statistics to at least one pre-determined threshold value; and upon determination by said router that said flow is exhibiting undesirable behavior, enforcing, relative to at least one packet belonging to said flow, a penalty;

wherein the preceding steps are performed on said router without requiring use of inter-router data.

3. An article of manufacture comprising:

a non-transitory computer-readable medium having stored thereon a data structure;

a first field containing data representing a flow block;

a second field containing data representing payload-content-agnostic behavioral statistics about dropped and non-dropped packets of a flow;

a third field containing data representing pre-determined behavior threshold values;

a fourth field containing data representing the results of a heuristic determination of whether said flow exhibits undesirable behavior determined by comparing said behavioral statistics to said pre-determined threshold values;

a fifth field containing data representing at least one penalty to be enforced against at least one packet upon determination that said flow exhibits undesirable behavior.

4. A machine implemented method for processing a flow, the flow comprising a series of information packets, the method comprising:

maintaining a set of behavioral statistics for the flow, wherein the set of behavioral statistics is updated based on each information packet belonging to the flow, as each information packet belonging to the flow is processed;

determining, based at least partially upon the set of behavioral statistics, whether the flow is exhibiting undesirable behavior, regardless of the presence or absence of congestion; and in response to a determination that the flow is exhibiting undesirable behavior, enforcing a penalty on the flow.

5. A machine implemented method for processing a flow, the flow comprising a series of information packets, the method comprising:

maintaining a set of behavioral statistics for the flow, wherein the set of behavioral statistics is updated based on each information packet belonging to the flow, as each information packet belonging to the flow is processed, regardless of the presence or absence of congestion;

determining, based at least partially upon the set of behavioral statistics, whether the flow is exhibiting undesirable behavior; and in response to a determination that the flow is exhibiting undesirable behavior, enforcing a penalty on the flow.

6. The method of claim 1, wherein enforcing the penalty has an effect of correcting the flow's behavior such that the flow exhibits less undesirable behavior.

7. The method of claim 1, wherein enforcing the penalty comprises:

imposing an increased drop rate on the flow such that the information packets belonging to the flow have a higher probability of being dropped than information packets belonging to other flows that do not exhibit undesirable behavior.

8. The method of claim 1, wherein the penalty is enforced when a congestion condition is encountered.

9. A machine implemented method for processing a flow, the flow comprising a series of information packets, the method comprising:

maintaining a set of behavioral statistics for the flow, wherein the set of behavioral statistics is updated based on each information packet belonging to the flow, as each information packet belonging to the flow is processed, regardless of the presence or absence of congestion; and computing, based at least partially upon the set of behavioral statistics, a badness factor for the flow, wherein the badness factor provides an indication of whether the flow is exhibiting undesirable behavior.

10. The method of claim 9, wherein the badness factor also provides an indication of a degree to which the flow is behaving undesirably.

11. The method of claim 10, further comprising:

determining, based at least partially upon the badness factor, a penalty to impose on the flow.

12. The method of claim 11, further comprising: enforcing the penalty on the flow.

13. The method of claim 12, wherein enforcing the penalty on the flow causes the flow to exhibit less undesirable behavior, thereby, causing the badness factor of the flow to improve.

14. The method of claim 12, wherein the penalty is enforced on the flow when a congestion condition is encountered.

15. The method of claim 12, wherein no penalty is enforced on the flow unless a congestion condition is encountered, regardless of how undesirably the flow is behaving.

16. The method of claim 12, wherein the penalty is determined and enforced on the flow even when no congestion condition is encountered.

17. The method of claim 12, wherein determining the penalty comprises:

determining an increased drop rate to impose on one or more information packets belonging to the flow.

18. The method of claim 17, wherein enforcing the penalty comprises:

imposing the increased drop rate on the flow such that the information packets belonging to the flow have a higher probability of being dropped than information packets belonging to other flows that do not exhibit undesirable behavior.

19. The method of claim 9, wherein the set of behavioral statistics comprises a measure T of how much total information has been contained in all of the information packets belonging to the flow that have been forwarded up to a current point in time.

20. The method of claim 9, wherein the set of behavioral statistics comprises a measure L of how long the flow has been in existence up to a current point in time.

21. The method of claim 20, wherein the set of behavioral statistics comprises a rate R of information transfer for the flow, wherein R is derived by dividing T by L.

22. The method of claim 9, wherein the set of behavioral statistics comprises an average size for the information packets belonging to the flow.

23. The method of claim 9, wherein maintaining the set of behavioral statistics comprises:

receiving a particular information packet belonging to the flow;

determining whether to forward the particular information packet to a destination; and in response to a determination to forward the particular information packet to the destination, updating the set of behavioral statistics to reflect processing of the particular information packet.

24. The method of claim 9, wherein maintaining the set of behavioral statistics comprises:

receiving a particular information packet belonging to the flow; and updating the set of behavioral statistics to reflect processing of the particular information packet, regardless of whether the particular information packet is discarded or forwarded to a destination.

25. A misbehaving flow manager (MFM) for processing a flow, the flow comprising a series of information packets, the MFM comprising:
  means for maintaining a set of behavioral statistics for the flow, wherein the set of behavioral statistics is updated based on each information packet belonging to the flow, as each information packet belonging to the flow is processed, regardless of the presence or absence of congestion;
  means for determining, based at least partially upon the set of behavioral statistics, whether the flow is exhibiting undesirable behavior; and
  means for enforcing, in response to a determination that the flow is exhibiting undesirable behavior, a penalty on the flow.

26. The MFM of claim 25, wherein enforcing the penalty has an effect of correcting the flow's behavior such that the flow exhibits less undesirable behavior.

27. The MFM of claim 25, wherein the means for enforcing the penalty comprises:
  means for imposing an increased drop rate on the flow such that the information packets belonging to the flow have a higher probability of being dropped than information packets belonging to other flows that do not exhibit undesirable behavior.

28. The MFM of claim 25, wherein the penalty is enforced when a congestion condition is encountered.

29. A misbehaving flow manager (MFM) for processing a flow, the flow comprising a series of information packets, the MFM comprising:
  means for maintaining a set of behavioral statistics for the flow, wherein the set of behavioral statistics is updated based on each information packet belonging to the flow, as each information packet belonging to the flow is processed, regardless of the presence or absence of congestion; and
  means for computing, based at least partially upon the set of behavioral statistics, a badness factor for the flow, wherein the badness factor provides an indication of whether the flow is exhibiting undesirable behavior.

30. The MFM of claim 29, wherein the badness factor also provides an indication of a degree to which the flow is behaving undesirably.

31. The MFM of claim 30, further comprising:
  means for determining, based at least partially upon the badness factor, a penalty to impose on the flow.

32. The MFM of claim 31, further comprising: means for enforcing the penalty on the flow.

33. The MFM of claim 32, wherein enforcing the penalty on the flow causes the flow to exhibit less undesirable behavior, thereby, causing the badness factor of the flow to improve.

34. The MFM of claim 32, wherein the penalty is enforced on the flow when a congestion condition is encountered.

35. The MFM of claim 32, wherein no penalty is enforced on the flow unless a congestion condition is encountered, regardless of how undesirably the flow is behaving.

36. The MFM of claim 32, wherein the penalty is determined and enforced on the flow even when no congestion condition is encountered.

37. The MFM of claim 32, wherein the means for determining the penalty comprises:
  means for determining an increased drop rate to impose on one or more information packets belonging to the flow.

38. The MFM of claim 37, wherein the means for enforcing the penalty comprises:
  means for imposing the increased drop rate on the flow such that the information packets belonging to the flow have a higher probability of being dropped than information packets belonging to other flows that do not exhibit undesirable behavior.

39. The MFM of claim 29, wherein the set of behavioral statistics comprises a measure T of how much total information has been contained in all of the information packets belonging to the flow that have been forwarded up to a current point in time.

40. The MFM of claim 29, wherein the set of behavioral statistics comprises a measure L of how long the flow has been in existence up to a current point in time.

41. The MFM of claim 40, wherein the set of behavioral statistics comprises a rate R of information transfer for the flow, wherein R is derived by dividing T by L.

42. The MFM of claim 29, wherein the set of behavioral statistics comprises an average size for the information packets belonging to the flow.

43. The MFM of claim 29, wherein the means for maintaining the set of behavioral statistics comprises:
  means for receiving a particular information packet belonging to the flow;
  means for determining whether to forward the particular information packet to a destination; and
  means for updating, in response to a determination to forward the particular information packet to the destination, the set of behavioral statistics to reflect processing of the particular information packet.

44. The MFM of claim 29, wherein the means for maintaining the set of behavioral statistics comprises:
  means for receiving a particular information packet belonging to the flow; and
  means for updating the set of behavioral statistics to reflect processing of the particular information packet, regardless of whether the particular information packet is discarded or forwarded to a destination.

* * * * *

Disclaimer

8,243,593 B2 - Vishnu Natchu, Santa Clara, CA (US). MECHANISM FOR IDENTIFYING AND PENALIZING MISBEHAVING FLOWS IN A NETWORK. Patent dated August 14, 2012. Disclaimer filed March 4, 2022, by the assignee, Sable Networks, Inc.

I hereby disclaim the following complete claims 1, 2, 4-8, 14-16, 25-28, 34-36 of said patent.

*(Official Gazette, September 6, 2022)*